(12) United States Patent
Narum

(10) Patent No.: US 8,892,828 B2
(45) Date of Patent: Nov. 18, 2014

(54) APPARATUSES AND METHODS FOR STORING VALIDITY MASKS AND OPERATING APPARATUSES

(75) Inventor: Steven R. Narum, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 245 days.

(21) Appl. No.: 13/299,430

(22) Filed: Nov. 18, 2011

(65) Prior Publication Data

US 2013/0132703 A1    May 23, 2013

(51) Int. Cl.
*G06F 12/00* (2006.01)
*G06F 12/10* (2006.01)

(52) U.S. Cl.
CPC .................................... *G06F 12/10* (2013.01)
USPC ........................................ 711/156; 711/103

(58) Field of Classification Search
USPC ................................................. 711/103, 156
See application file for complete search history.

(56) References Cited

U.S. PATENT DOCUMENTS

| | | | |
|---|---|---|---|
| 4,879,687 A * | 11/1989 | Okamoto et al. | 365/200 |
| 5,361,345 A | 11/1994 | English | |
| 5,598,553 A * | 1/1997 | Richter et al. | 703/23 |
| 6,978,353 B2 | 12/2005 | Lee et al. | |
| 7,873,878 B2 | 1/2011 | Belluomini et al. | |
| 2003/0120881 A1 | 6/2003 | Lai et al. | |
| 2004/0143701 A1 | 7/2004 | Giambalvo | |
| 2006/0109725 A1* | 5/2006 | Yoon et al. | 365/200 |
| 2010/0088467 A1 | 4/2010 | Lee et al. | |
| 2010/0235715 A1* | 9/2010 | Thatcher et al. | 714/763 |
| 2011/0078367 A1 | 3/2011 | Minkin et al. | |

FOREIGN PATENT DOCUMENTS

| | | | | |
|---|---|---|---|---|
| CN | 101770427 | * | 1/2009 | ............. G06F 12/06 |
| WO | 2011030290 A1 | | 3/2011 | |

OTHER PUBLICATIONS

International Search Report for related PCT Application No. PCT/US2012/064480, mailed Apr. 1, 2013, (10 pgs.).

* cited by examiner

*Primary Examiner* — Aimee Li
*Assistant Examiner* — Christopher Do
(74) *Attorney, Agent, or Firm* — Brooks, Cameron & Huebsch, PLLC

(57) ABSTRACT

Apparatuses and methods for storing a validity mask and operating apparatuses are described. A number of methods for operating an apparatus include storing a validity mask that is associated with a number of pages of memory cells in a group of pages and that provides validity information for the number of pages of memory cells in the group of pages.

29 Claims, 1 Drawing Sheet

| | ⎡220<br>COUNT | ⎡222<br>OFFSET | ⎡224<br>WINDOW 0 | ⎡226<br>WINDOW 1 | ⎡228<br>WINDOW 2 | ⎡230<br>WINDOW 3 |
|---|---|---|---|---|---|---|
| 232-0 | 128 | 0 | 0 | 11101111 | 11111111 | 01110011 |
| 232-12 | 128 | 12 | 11101111 | 11111111 | 01110011 | 11110111 |
| 232-44 | 128 | 44 | 11111111 | 11101111 | 11111111 | 01111111 |
| 232-80 | 128 | 80 | 10111111 | 11111111 | 11010110 | 11111111 |
| 232-100 | 128 | 100 | 11010110 | 11111111 | 01111111 | 11111111 |
| 232-127 | 128 | 127 | 11111111 | 10110001 | 0 | 0 |

| | 220 COUNT | 222 OFFSET | 224 WINDOW 0 | 226 WINDOW 1 | 228 WINDOW 2 | 230 WINDOW 3 |
|---|---|---|---|---|---|---|
| 232-0 | 128 | 0 | 0 | 11101111 | 11111111 | 01110011 |
| 232-12 | 128 | 12 | 11101111 | 11111111 | 01110011 | 11110111 |
| 232-44 | 128 | 44 | 11111111 | 11101111 | 11111111 | 01111111 |
| 232-80 | 128 | 80 | 10111111 | 11111111 | 11010110 | 11111111 |
| 232-100 | 128 | 100 | 11010110 | 11111111 | 01111111 | 11111111 |
| 232-127 | 128 | 127 | 11111111 | 10110001 | 0 | 0 |

APPARATUSES AND METHODS FOR STORING VALIDITY MASKS AND OPERATING APPARATUSES

TECHNICAL FIELD

The present disclosure relates generally to semiconductor memory apparatuses and methods, and more particularly, to apparatuses and methods for storing validity masks and operating apparatuses.

BACKGROUND

Memory devices are typically provided as internal, semiconductor, integrated circuits in computers or other electronic devices. There are many different types of memory including volatile and non-volatile memory. Volatile memory can require power to maintain its information, e.g., data, and includes random-access memory (RAM), dynamic random access memory (DRAM), synchronous dynamic random access memory (SDRAM), and static random access memory (SRAM) among others. Non-volatile memory can provide persistent information by retaining stored information when not powered and can include NAND flash memory, NOR flash memory, read only memory (ROM), Electrically Erasable Programmable ROM (EEPROM), Erasable Programmable ROM (EPROM), and phase change random access memory (PCRAM), among others.

Memory devices can be combined together to form a solid state drive (SSD). A solid state drive can include non-volatile memory, e.g., NAND flash memory and NOR flash memory, and/or can include volatile memory, e.g., DRAM and SRAM, among various other types of non-volatile and volatile memory. Flash memory devices, including floating gate flash devices and charge trap flash (CTF) devices using semiconductor-oxide-nitride-oxide-semiconductor and metal-oxide-nitride-oxide-semiconductor capacitor structures that store information in charge traps in the nitride layer, may be utilized as non-volatile memory for a wide range of electronic applications. Flash memory devices typically use a one-transistor memory cell that allows for high memory densities, high reliability, and low power consumption.

An SSD can be used to replace hard disk drives as the main storage device for a computing system, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives. SSD manufacturers can use non-volatile flash memory to create flash SSDs that may not use an internal battery supply, thus allowing the drive to be more versatile and compact.

An SSD can include a number of memory devices, e.g., a number of memory chips (as used herein, "a number of" something can refer to one or more of such things, e.g., a number of memory devices can refer to one or more memory devices). As one of ordinary skill in the art will appreciate, a memory chip can include a number of dies and/or logical units (LUNs). Each die can include a number of memory arrays and peripheral circuitry thereon. The memory arrays can include a number of memory cells organized into a number of physical pages, and the physical pages can be organized into a number of blocks.

A redundant array of independent devices (RAID) is an umbrella term for computer data storage schemes that divide and/or replicate data among multiple memory devices. The multiple memory devices in a RAID array may appear to a user and the operating system of a computer as a single memory device, e.g., disk.

Portions of a memory device, such as a number of pages of a block, can be corrupt and may not be able to have data written to them and/or data read from them. The portions of a memory device that are corrupt may be indicated in a master record. Portions of the master record can also become corrupt, thus losing the ability to locate corrupt portions of the memory device.

DETAILED DESCRIPTION

Figures 1, 2:
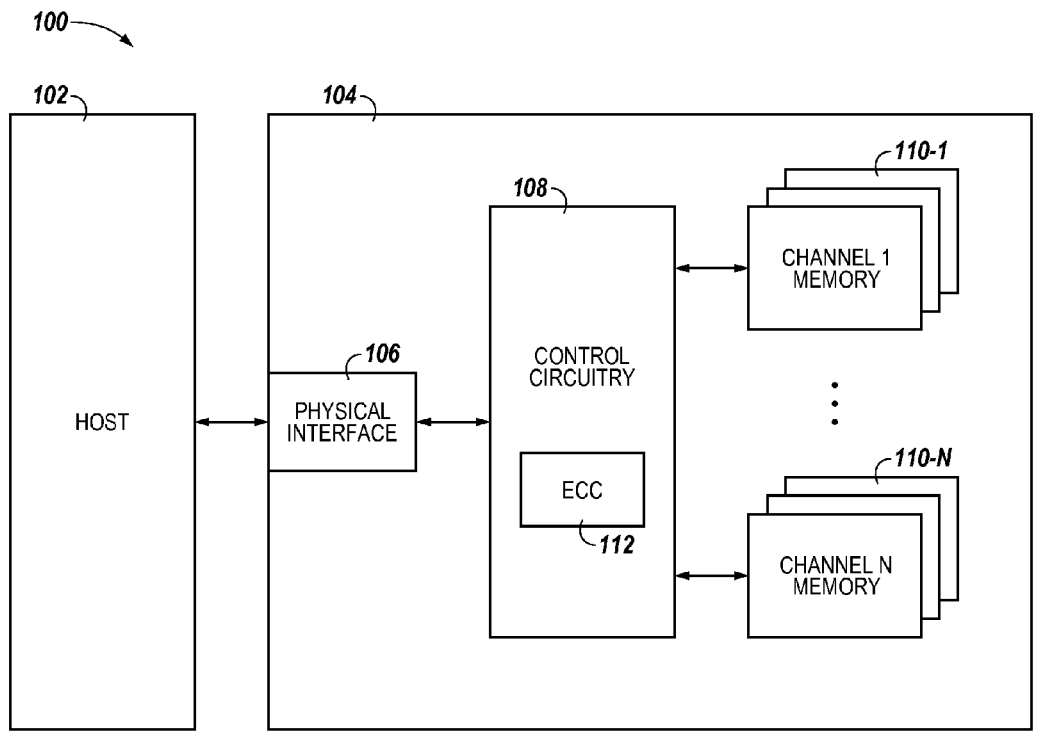
FIG. 1 is a functional block diagram of an apparatus in the form of a computing system in accordance with a number of embodiments of the present disclosure.
FIG. 2 illustrates a table of a number of validity masks stored in a computing system in accordance with a number of embodiments of the present disclosure.

The present disclosure includes apparatuses and methods for storing a validity mask and operating apparatuses. A number of methods for operating an apparatus include storing a validity mask that is associated with a number of pages of memory cells in a group of pages and that provides validity information for the number of pages of memory cells in the group of pages.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, the designator "N", particularly with respect to reference numerals in the drawings, indicates that a number of the particular feature so designated can be included with a number of embodiments of the present disclosure. Additionally, as used herein, "a number of" something can refer to one or more such things. For example, a number of memory devices can refer to one or more memory devices.

The figures herein follow a numbering convention in which the first digit or digits correspond to the drawing figure number and the remaining digits identify an element or component in the drawing. Similar elements or components between different figures may be identified by the use of similar digits. For example, 150 may reference element "50" in FIG. 1, and a similar element may be referenced as 250 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

FIG. 1 is a functional block diagram of an apparatus in the form of a computing system 100 including at least one memory system 104 in accordance with a number of embodiments of the present disclosure. In the embodiment illustrated in FIG. 1, the memory system 104, e.g., a solid state drive (SSD), can include a physical host interface 106, a memory system controller 108, e.g., an SSD controller, and a number of solid state memory devices 110-1, . . . , 110-N. The solid state memory devices 110-1, . . . , 110-N can provide a storage volume for the memory system. In a number of embodiments, the solid state memory system controller 108 can be an application specific integrated circuit (ASIC), where the controller 108, e.g., in the form of an ASIC, is coupled to a printed circuit board including the physical interface 106 and solid state memory devices 110-1, . . . , 110-N.

As illustrated in FIG. 1, the memory system controller 108, e.g., a solid state memory system controller, can be coupled to the physical host interface 106 and to the solid state memory devices 110-1, . . . , 110-N. The physical host interface 106 can be used to communicate information between the memory system 104 and another device such as a host 102. Host 102 can include a memory access device, e.g., a processor. One of ordinary skill in the art will appreciate that "a processor" can intend a number of processors, such as a parallel processing system, a number of coprocessors, etc. Examples of hosts include laptop computers, personal computers, digital cameras, digital recording and playback devices, mobile telephones, PDAs, memory card readers, interface hubs, and the like. For a number of embodiments, the physical host interface 106 can be in the form of a standardized physical interface. For example, when the memory system 104 is used for information storage in a computing system 100, the physical host interface 106 can be a serial advanced technology attachment (SATA) physical interface, a peripheral component interconnect express (PCIe) physical interface, a small computer system interface (SCSI) interface, a serial attachment SCSI (SAS) interface, or a universal serial bus (USB) physical interface, among other interfaces. In general, however, the physical host interface 106 can provide an interface for passing control, address, information, e.g., data, and other signals between the memory system 104 and a host 102 having compatible receptors for the physical host interface 106.

The solid state memory system controller 108 can communicate with the solid state memory devices 110-1, . . . , 110-N to read, write, and erase information, among other operations. The solid state memory system controller 108 can have firmware and/or circuitry that may be a number of integrated circuits and/or discrete components. For a number of embodiments, the circuitry in solid state memory system controller 108 may include control circuitry for controlling access across the solid state memory devices 110-1, . . . , 110-N and circuitry for providing a translation layer between a host 102 and the memory system 104. Thus, a memory controller could selectively couple an I/O connection (not shown in FIG. 1) of a solid state memory device 110-1, . . . , 110-N to receive the appropriate signal at the appropriate I/O connection at the appropriate time. Similarly, the communication protocol between a host 102 and the memory system 104 may be different than what is required for access of a solid state memory device 110-1, . . . , 110-N. Solid state memory system controller 108 could then translate the commands received from the host 102 into the appropriate commands to achieve the desired access to a solid state memory device 110-1, . . . , 110-N.

The solid state memory devices 110-1, . . . , 110-N can include a number of memory cells that can be associated together. As used herein, a number of memory cells can be associated together as pages, blocks, planes, dies, entire arrays, or other associations. For example, some memory arrays can include a number of pages of memory cells that make up a block of memory cells. A page of memory cells are those memory cells that can be read from or written to in a single operation. In some cases, such as in all bit line architectures, a page of memory cells can be a row of memory cells commonly coupled to a particular word line. In other architectures, such as in shielded bit line architectures, a page of memory cells can be every other memory cell of a row of memory cells commonly coupled to a particular word line (e.g., where a single row of memory cells commonly coupled to a particular word line may include two pages of memory cells: an "odd" page and an "even" page). Other associations of memory cells forming a page of memory cells may exist in the past, present, or future. A number of blocks can be included in a plane of memory cells. A number of planes of memory cells can be included on a die. As an example, a 128 GB memory device can include pages of memory cells that can include 4320 bytes of data per page of memory cells, 128 pages per block, 2048 blocks per plane, and 16 planes per device.

In a number of embodiments, each solid state memory device 110-1, . . . , 110-N can be coupled to the control circuitry 108 by a separate channel. Each channel can be associated with discrete channel control circuitry.

The controller 108 can include error recovery, e.g., detection and/or correction, circuitry 112, e.g., error correction code (ECC) circuitry, coupled to each channel control circuit and/or a number of error recovery, e.g., detection and/or correction, circuits that can be used with more than one channel. The error recovery circuitry 112 can be configured to detect and/or correct errors associated with information read from solid state memory devices 110-1, . . . , 110-N. The error recovery circuitry 112 can be configured to provide differing error recovery schemes for single and/or multi level cell (SLC/MLC) operation.

In a RAID array, a stripe write operation can include a plurality of page write operations, e.g., one page write operation per each channel associated with the non-volatile memory control circuitry. In a number of embodiments, the plurality of page write operations in the stripe write operation can be performed substantially simultaneously across the plurality of channels. A page write operation can allow access to a page of memory cells. A page write command can be sent, e.g., queued, to the desired channel memory controller and executed on the number of solid state memory devices 110-1, . . . , 110-N. For example, a page write operation can include 4 kilobytes (KB), 8 KB, or another volume of user data, depending upon the size of a page of memory cells in solid state memory device 110-1, . . . , 110-N, plus meta-data. Data from a page write operation can be transferred from a write buffer to a solid state memory device 110-1, . . . , 110-N by the channel memory controller. Write data for a stripe write operation can be received from a host, e.g., host 102 in FIG. 1.

Write data can be striped across a storage volume of a plurality of solid state memory devices 110-1, . . . , 110-N. For example, a first portion of write data received from a host can be written to a first memory device, a second portion to a second memory device, etc. Although data may be written in a stripe-based operation, data may still be read in a page-based operation. Data included in the write data, e.g., user data plus meta-data, for a page of memory cells can include a validity mask. The validity mask can include a number of units, e.g., bits, of data wherein each unit of data provides the validity status of a respective page of memory cells written across the storage volume during a stripe write operation. The validity status provided by a unit of data in the validity mask can provide the validity information for a page of memory cells. The validity mask can be used during a RAID recovery operation in which data that was striped to a number of memory devices in a RAID array is being recovered. The validity mask can be used to determine whether data from a page of memory cells in a stripe of data was valid, and therefore whether the RAID recovery operation should attempt to recover the data from a page of memory cells.

The memory system 104 can store a validity mask associated with a group of pages of memory cells. The validity mask can include a number of bits of data, where a portion of the number of bits provides validity information for a number of pages of memory cells in the group of pages. The validity mask can be stored in a page, e.g., target page, of memory cells of the group of pages and include the validity information for the page of memory cells in which it is stored, e.g., target page, and a number of other pages of memory cells of the group of pages. The validity mask can be part of metadata that is stored in a page of memory cells and be associated with the page of memory cells in which it is stored.

In a number of embodiments, the validity mask can store validity information for a number of pages of memory cells of the group of pages based on the sequence in which the pages of memory cells are written. The pages of memory cells of the group of pages are written in a known sequence, therefore a validity mask stored in a page of memory cells of the group of pages includes validity information for a number of pages of memory cells written prior to and/or after the page of memory cells in which the validity mask is stored. For example, the validity mask can include validity information for a certain number of pages of memory cells written prior to the page of memory cells in which the validity mask is stored and a certain number of pages of memory cells written after the page of memory cells in which the validity mask is stored.

In a number of embodiments, the validity information can be based on bits of data representing binary data values, e.g., "1" or "0", stored as the validity mask, where a binary data value "1" indicates the page of memory cells associated with the bit is good, e.g., is able to have data written to the page of memory cells and/or data read from the page of memory cells, and a binary data value "0" indicates the page of memory cells associated with the bit is corrupt and/or bad, e.g., is not able to have data written to the page of memory cells and/or data read from the page of memory cells. A page of memory cells can be known corrupt and/or bad and skipped during a write operation and/or a page of memory cells can become corrupt and/or bad during operation of a memory device and reading errors occur when attempting to read data from the page of memory cells. The validity information can be used by a memory system when attempting to recover data in a group of pages that is not readable. The memory system can use the validity information from a validity mask to determine whether a page of memory cells from a group of pages that is not readable had data that should be recovered. For example, if a page of memory cells from a group of pages that is not readable was known to be corrupt and/or bad based on validity information from a validity mask, an attempt to recover data from that page of memory cells is not made during an ECC operation and/or a RAID recovery operation, e.g., the ECC operation and/or RAID recovery operation can skip the corrupt and/or bad pages of memory cells of the group of pages based on the validity information in a validity mask.

In a number of embodiments, a validity mask can include validity information for each page of memory cells of a group of pages. In a number of embodiments, a validity mask can include validity information of a portion of the pages of memory cells of a group of pages. The portion of the pages of memory cells of a group of pages that have validity information stored in a validity mask can be based on the sequence in which the pages of memory cells of the group of pages are written and/or the ability of an ECC operation and/or a RAID recovery operation to recover data on pages of memory cells that become corrupt and/or bad, e.g., pages of memory cells that are not able to have data written to them and/or data read from them. For example, a validity mask can include validity information for the 15 pages of memory cells written immediately prior to the page of memory cells in which the validity mask is stored and for the 16 pages of memory cells written immediately after the page of memory cells in which the validity mask is stored. The validity mask includes validity information for 32 pages of memory cells, which can, for example, be at least one more page than can be recovered via an ECC operation and/or RAID recovery operation.

The computing system 100 illustrated in FIG. 1 can include additional circuitry beyond what is illustrated. The detail of the computing system 100 illustrated in FIG. 1 has been reduced so as not to obscure embodiments of the present disclosure. For example, the memory system 104 can include address circuitry to latch address signals provided over I/O connections through I/O circuitry. Address signals can be received and decoded by a row decoder and a column decoder to access the solid state memory devices 110-1, . . . , 110-N. It will be appreciated by those skilled in the art that the number of address input connections can depend on the density and architecture of the solid state memory devices 110-1, . . . , 110-N.

FIG. 2 illustrates a table of a number of validity masks stored in a computing system in accordance with a number of embodiments of the present disclosure. FIG. 2 illustrates a number of validity masks 232-0, 232-12, 232-44, 232-80, 232-100, and 232-127 that are stored in a number of pages of memory cells. The number of pages of memory cells are part of a group, such as a block and, for example, a block can include 128 pages. In FIG. 2, validity mask 232-0 is stored in page 0 of the group, validity mask 232-12 is stored in page 12 of the group, validity mask 232-44 is stored in page 44 of the group, validity mask 232-80 is stored in page 80 of the group, validity mask 232-100 is stored in page 100 of the group, and validity mask 232-127 is stored in page 127 of the group.

The validity masks 232-0, 232-12, 232-44, 232-80, 232-100, and 232-127 each include a count 220, which indicates the number of pages of memory cells in the group; an offset 222, which indicates the page of memory cells in the group associated with the validity mask; a first window 224; a second window 226; a third window 228; and a fourth window 230, where each window includes a number of bits providing the validity status of pages of memory cells in the group.

In a number of embodiments, a group of pages can be further divided into windows of 8 pages of memory cells, where a window associated with a validity mask can include a number of bits in the validity mask that are associated with a number of pages of memory cells in the group. For example, each window can include 8 bits, each associated with a different page of memory cells in the group, and therefore each window includes validity information for 8 pages of memory cells in the group. First window 224 can include validity information for 8 pages of memory cells in a window that includes the page of memory cells written 8 pages before the page of memory cells in which the validity mask is stored. Second window 226 can include validity information for 8 pages of memory cells in a window that includes the page of memory cells in which the validity mask is stored. Third window 228 can include validity information for 8 pages of memory cells in a window that includes the page of memory cells written 8 pages after the page of memory cells in which the validity mask is stored. Fourth window 230 can include validity information for 8 pages of memory cells in a window that includes the page of memory cells written 16 pages after the page of memory cells in which the validity mask is stored.

In a number of embodiments, validity masks 232-0, 232-12, 232-44, 232-80, 232-100, and 232-128 can include 48 bits, 8 bits provide the count, 8 bits provide the offset, and 8 bits for each of the four windows providing validity information for a number of pages of memory cells of the group. In a number of embodiments, a number of bits can provide validity information. For example, a validity mask can include 32 bits providing validity information for 32 pages of memory cells and, in another example, a validity mask can include 48 bits providing validity information for 48 pages of memory cells. The number of bits in a validity mask used to provide validity information can be based on the amount of storage that can be dedicated to storing the validity mask and the desire to have accessible validity information for use during an ECC operation and/or a RAID recovery operation.

In a number of embodiments, the validity information from a number of validity masks can be used in combination to obtain validity information for a number of pages of memory cells, such as each page of memory cells in a group of pages or each of the pages of memory cells in a computing system. The validity masks that include validity information for a portion of the pages of memory cells in a group of pages can be combined to obtain validity information for each page of memory cells in a group of pages, thus reducing the need to store validity information for an entire group of pages in a validity mask stored in a particular page of memory cells of the group of pages. The validity masks can include validity information for at least one more page than the number of pages of memory cells that can be recovered during an ECC operation and/or a RAID recovery operation. Therefore, validity information for each page of memory cells of a group of pages can be known via validity masks stored in pages of memory cells of a group of pages and/or through data recovered in an ECC operation and/or a RAID recovery operation.

In a number of embodiments, a master record that indicates validity status, among other information, for each page of memory cells in a computing system can be stored in a number of memory devices of the computing system. In the event that the master record becomes corrupt, the validity masks stored in pages of memory cells of the computing system can be used to recover the master record. The validity masks stored in pages of memory cells of the computing system can also be used as an alternative to the master record when determining the validity status of a page of memory cells.

CONCLUSION

The present disclosure includes apparatuses and methods for storing a validity mask and operating apparatuses. A number of methods for operating an apparatus include storing a validity mask that is associated with a number of pages of memory cells in a group of pages and that provides validity information for the number of pages of memory cells in the group of pages.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for operating an apparatus, comprising:
   storing a validity mask in a target page of memory cells, wherein the validity mask is associated with a first number of pages of memory cells in a group of pages, wherein the first number of pages of memory cells are a portion of a total number of pages in the group of pages, wherein the validity mask includes validity information that indicates a validity status for each of the first number of pages of memory cells, and wherein the first number of pages of memory cells includes the target page of memory cells, pages of memory cells that were written before the target page, and pages of memory cells that were written after the target page.

2. The method of claim 1, wherein storing the validity mask includes storing the validity mask in the apparatus.

3. The method of claim 2, wherein the apparatus is a memory system.

4. The method of claim 2, wherein storing the validity mask includes storing the validity mask in a number of memory devices of the apparatus.

5. The method of claim 1, wherein storing the validity mask includes storing a count indicating the number of pages in the group of pages.

6. The method of claim 1, wherein storing the validity mask includes storing an offset indicating a location of the target page of memory cells in the group of pages associated with the validity mask.

7. The method of claim 1, wherein storing the validity mask includes storing a count, an offset, and validity information in a number of units of data of the validity mask.

8. The method of claim 1, wherein storing the validity mask includes storing a number of units of data of the validity mask, wherein a portion of the number of units indicates a validity status of a particular page of memory cells in the group of pages.

9. A method for operating an apparatus, comprising:
   storing a number of units of data of a validity mask in a particular page of memory cells in a group of pages, wherein the number of units of data provide validity information for a first number of pages of memory cells in the group of pages, and wherein the first number of pages of memory cells includes the particular page of memory cells, pages of memory cells that were written before the particular page, and pages of memory cells that were written after the particular page.

10. The method of claim 9, wherein storing the number of units of data of the validity mask includes storing the number of units of data in the apparatus.

11. The method of claim 10, wherein storing the number of units of data of the validity mask includes storing the number of units of data in a number of memory devices of the apparatus.

12. The method of claim 9, wherein the validity information includes providing validity information for at least one more page than a number of pages of memory cells that can be recovered using an ECC operation.

13. The method of claim 9, including combining the validity mask of the particular page of memory cells with other validity masks associated with a number of pages of memory cells in the group to form a validity mask for the group of pages.

14. The method of claim 9, wherein the validity information includes validity information for pages of memory cells that are to be skipped during a write operation.

15. The method of claim 9, wherein the validity information includes validity information for pages of memory cells that are determined to not be able to have data read from the pages of memory cells due to reading errors associated with the pages.

16. The method of claim 9, wherein a portion of the number of units provides a validity information for a respective page of memory cells written in a sequence.

17. A method for operating an apparatus, comprising:
writing data to a number of pages of memory cells in a sequence; and
storing a validity mask in a target page of memory cells, wherein the validity mask is associated with at least a portion of the number of pages of memory cells in the sequence that is less than a total number of pages of memory cells in the sequence, wherein the validity mask includes validity information that indicates a validity status for each page of the portion of the number of pages of memory cells, and wherein the validity mask includes validity information for the number of pages of memory cells in the sequence that includes pages of memory cells in the sequence that are written prior to the target page of memory cells, the target page of memory cells, and pages of memory cells that are written after the target page of memory cells.

18. The method of claim 17, wherein storing the validity mask includes storing the validity mask in a number of memory devices of the apparatus.

19. The method of claim 17, wherein the validity mask includes validity information for at least one more page than a number of pages of memory cells that can be recovered using an ECC operation.

20. The method of claim 17, wherein the validity mask includes validity information that indicates which of the number of pages of memory cells to attempt to recover using an ECC operation.

21. An apparatus, comprising:
a number of arrays of memory cells; and
a controller operably coupled to the number of arrays and configured to:
stripe data to a group of pages of memory cells, wherein the group of pages includes pages of memory cells of the number of arrays of memory cells; and
store a validity mask in a target page of memory cells, wherein the validity mask provides validity information for a first number of pages of memory cells in the group of pages, wherein the first number of pages of memory cells are a portion of a total number of pages in the group of pages, wherein the validity information indicates a validity status for each of the first number of pages of memory cells, and wherein the first number of pages of memory cells includes the target page of memory cells, pages of memory cells that were written before the target page, and pages of memory cells that were written after the target page.

22. The apparatus of claim 21, wherein a number of units of data of the validity mask are based on a sequence of writing data to the group of pages of memory cells.

23. The apparatus of claim 21, wherein a unit of data of the validity mask provides the validity status of a particular page of the number of pages of the group of pages.

24. The apparatus of claim 21, wherein the validity mask includes a count indicating the number of pages of memory cells in the group of pages associated with the validity mask.

25. The apparatus of claim 21, wherein the validity mask includes an offset indicating a location of a target page of memory cells in the group of pages associated with the validity mask and wherein the validity mask is stored in the target page of memory cells.

26. An apparatus, comprising:
a number of arrays of memory cells; and
a controller operably coupled to the number of arrays and configured to:
store a validity mask associated with a number of pages of memory cells in an array of memory cells, wherein the number of pages of memory cells includes a first number of pages of memory cells prior to a target page of memory cells in a write sequence and a second number of pages of memory cells after the target page of memory cells in the write sequence, wherein the first and second number of pages of memory cells are a portion of a total number of pages in the array of memory cells and wherein the validity information indicates a validity status for each of the first and second number of pages of memory cells.

27. The apparatus of claim 26, wherein the number of pages of memory cells includes at least one more page than a number of pages of memory cells that can be corrected using an ECC operation.

28. The apparatus of claim 26, wherein the validity mask includes a number of bits of data where a portion of the bits provide validity information of a respective page of the number of pages of memory cells.

29. The apparatus of claim 26, wherein the validity mask is stored as metadata associated with the target page of memory cells.

* * * * *

UNITED STATES PATENT AND TRADEMARK OFFICE
CERTIFICATE OF CORRECTION

| | | |
|---|---|---|
| PATENT NO. | : 8,892,828 B2 | Page 1 of 1 |
| APPLICATION NO. | : 13/299430 | |
| DATED | : November 18, 2014 | |
| INVENTOR(S) | : Steven R. Narum | |

It is certified that error appears in the above-identified patent and that said Letters Patent is hereby corrected as shown below:

In the Claims

Column 8, line 41, Claim 5, delete "the number" and insert -- the total number --, therefor.

Signed and Sealed this
Twenty-fourth Day of February, 2015

Michelle K. Lee
*Deputy Director of the United States Patent and Trademark Office*